United States Patent
Shirakawa et al.

(10) Patent No.: US 10,852,410 B2
(45) Date of Patent: Dec. 1, 2020

(54) ANGLE ESTIMATING APPARATUS AND ANGLE ESTIMATING METHOD

(71) Applicants: FUJITSU LIMITED, Kawasaki (JP); FUJITSU TEN LIMITED, Kobe (JP)

(72) Inventors: Kazuo Shirakawa, Yokohama (JP); Yasuhiro Kurono, Kobe (JP)

(73) Assignee: DENSO TEN LIMITED, Hyogo (JP)

( * ) Notice: Subject to any disclaimer, the term of this patent is extended or adjusted under 35 U.S.C. 154(b) by 490 days.

(21) Appl. No.: 14/878,846

(22) Filed: Oct. 8, 2015

(65) Prior Publication Data
US 2016/0103207 A1 Apr. 14, 2016

(30) Foreign Application Priority Data
Oct. 9, 2014 (JP) ................................. 2014-208417

(51) Int. Cl.
*G01S 13/42* (2006.01)
*G01S 7/40* (2006.01)
*G01S 3/74* (2006.01)
*G01S 13/931* (2020.01)

(52) U.S. Cl.
CPC ............... *G01S 13/42* (2013.01); *G01S 3/74* (2013.01); *G01S 7/4021* (2013.01); *G01S 13/931* (2013.01)

(58) Field of Classification Search
CPC ... G01S 7/354; G01S 7/34; G01S 7/93; G01S 7/931
See application file for complete search history.

(56) References Cited

U.S. PATENT DOCUMENTS

| 6,317,073 | B1* | 11/2001 | Tamatsu | G01S 7/352 342/70 |
| 9,348,023 | B2* | 5/2016 | Asanuma | G01S 13/345 |
| 2007/0120730 | A1* | 5/2007 | Takano | G01S 13/42 342/70 |
| 2008/0122681 | A1* | 5/2008 | Shirakawa | G01S 3/74 342/147 |
| 2012/0112954 | A1 | 5/2012 | Kurono et al. | |

(Continued)

FOREIGN PATENT DOCUMENTS

JP 2007-147554 A 6/2007
JP 2010-19086 A 9/2010

(Continued)

*Primary Examiner* — Vongsavanh Sengdara
(74) *Attorney, Agent, or Firm* — Arent Fox LLP

(57) ABSTRACT

A receiving circuit uses a weight set by calibration to weight signals incident to receiving elements. A storing unit stores a measured value of a mode vector reflecting characteristics of the receiving circuit in an error-free state of the weight for the receiving circuit characteristics and further correlates and stores an incident signal angle estimated by an estimating unit, and for the error-free state, a calculation result of an evaluation value by an evaluation function capable of calculating the evaluation value, which varies according to the incident signal angle and error. A detecting unit calculates the evaluation value based on the stored measured value of the mode vector and the evaluation function and detects an occurrence of the error based on comparison of the calculated evaluation value and the stored evaluation value, when the estimated incident signal angle corresponds to a value close to the stored incident signal angle.

15 Claims, 7 Drawing Sheets

(56) References Cited

U.S. PATENT DOCUMENTS

2013/0069818 A1*  3/2013  Shirakawa ............ G01S 13/347
                                                  342/146
2013/0147656 A1*  6/2013  Shirakawa .............. G01S 13/42
                                                  342/146

FOREIGN PATENT DOCUMENTS

| JP | 2011-038837 A | 2/2011 |
| JP | 2012-103132 A | 5/2012 |
| WO | WO 2006/067869 A1 | 6/2006 |

* cited by examiner

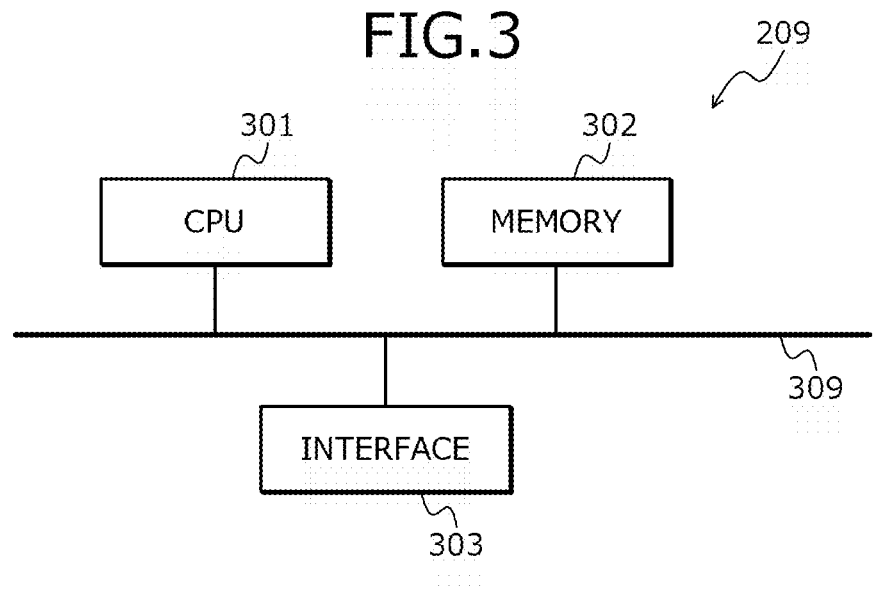
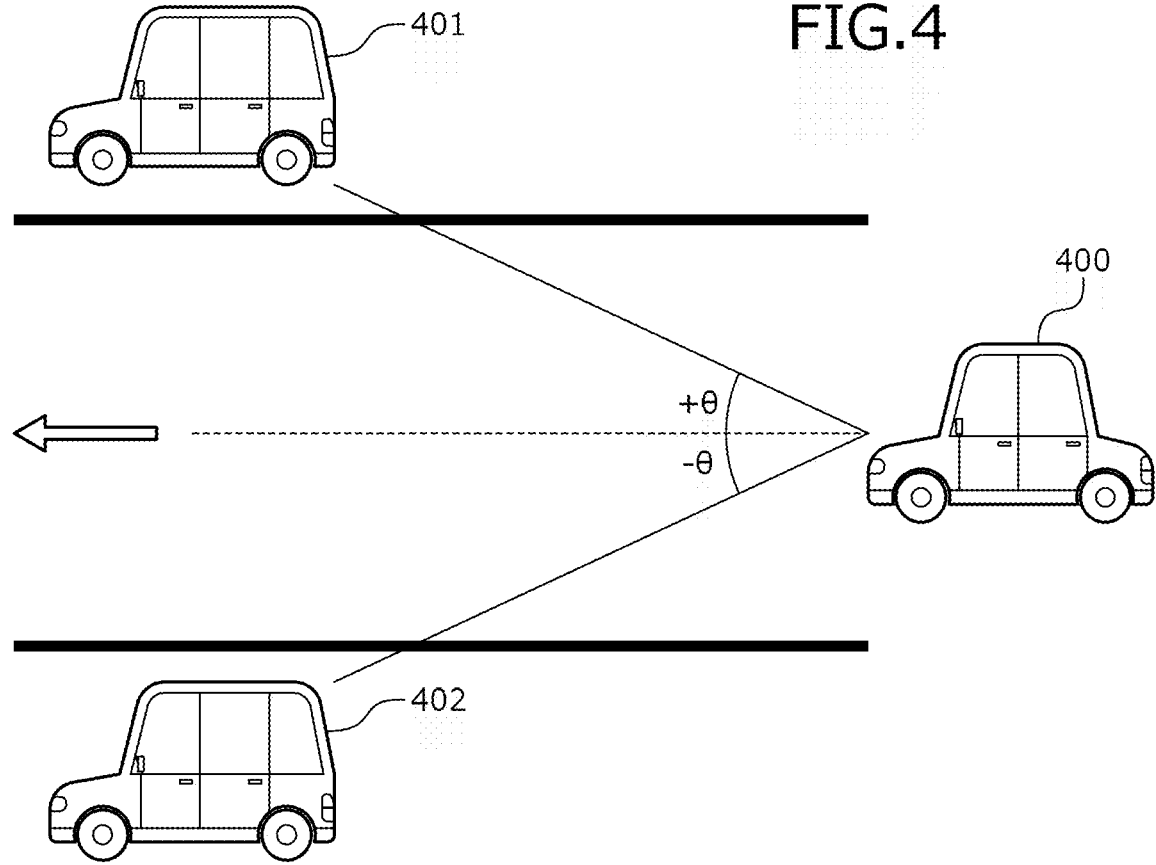

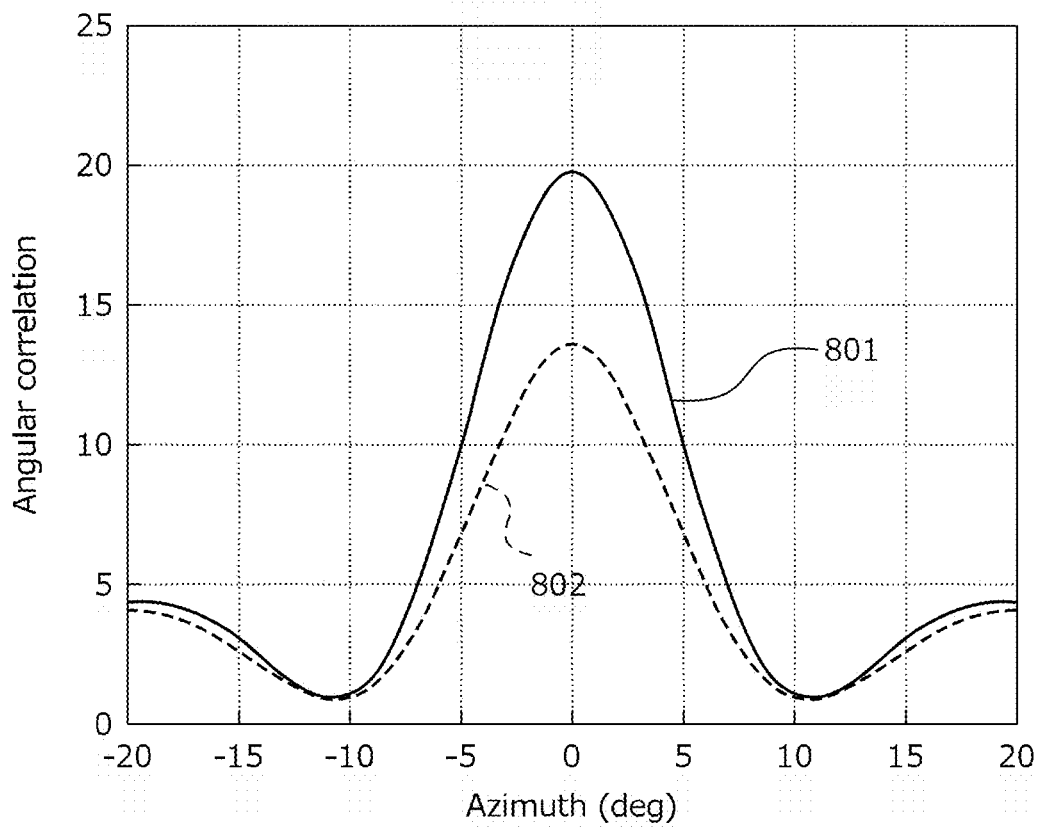

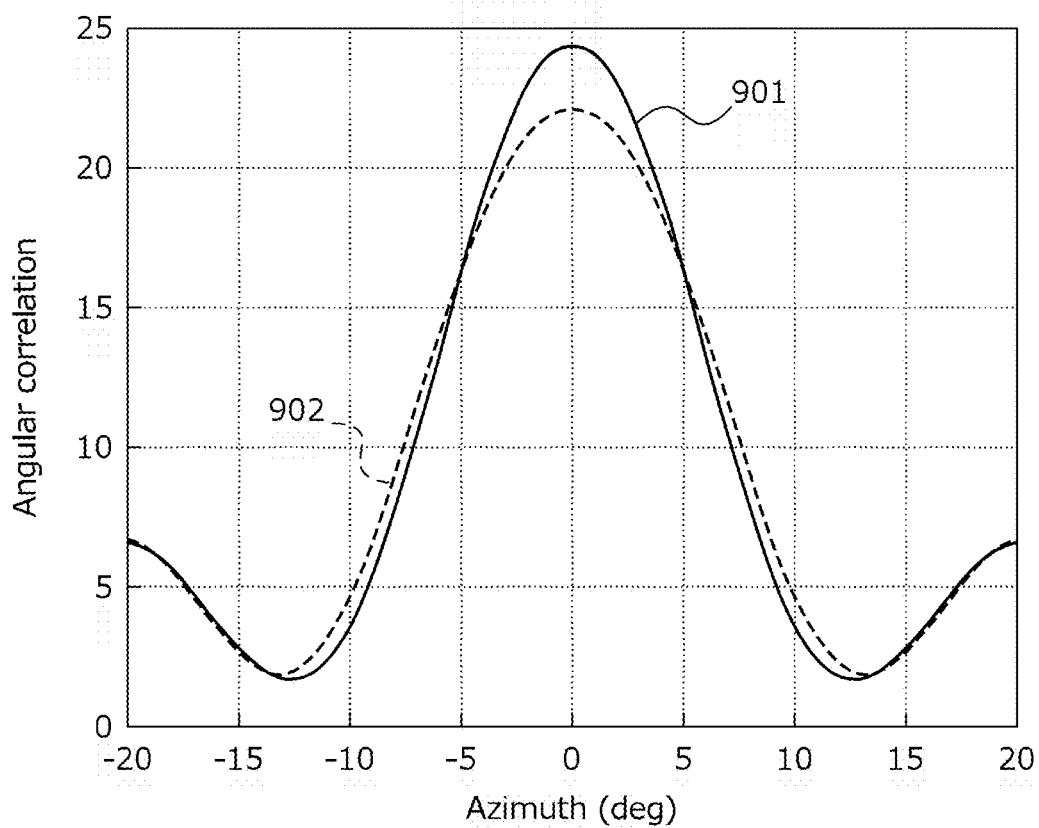

ANGLE ESTIMATING APPARATUS AND ANGLE ESTIMATING METHOD

CROSS REFERENCE TO RELATED APPLICATIONS

This application is based upon and claims the benefit of priority of the prior Japanese Patent Application No. 2014-208417, filed on Oct. 9, 2014, the entire contents of which are incorporated herein by reference.

FIELD

The embodiments discussed herein are related to an angle estimating apparatus and an angle estimating method.

BACKGROUND

One conventional apparatus generates a covariance matrix using baseband signal vectors generated by demodulating waves received by plural sensors and reflected from a target. The apparatus extracts a submatrix, and uses eigenvalues of a regular matrix calculated from the submatrix, to calculate the angle of the target (for example, refer to Japanese Laid-Open Patent Publication No. 2012-103132). Another conventional apparatus combines correlation vectors of baseband signals (hereinafter, expressed as simply "reception signals" when there is no confusion) generated from arriving signals received by plural sensors. The apparatus obtains a spatial average covariance matrix R, and uses $(RR^H)^{-1}$ (H: complex conjugate transpose) from the spatial average covariance matrix R to estimate the arrival direction of an arriving signal from angular distribution or an algebraic equation (for example, refer to Published Japanese-Translation of PCT Application, Publication No. 2006/067869).

Nonetheless, with the conventional technologies, a problem arises in that when an operation (calibration) of obtaining a weight for each signal, including characteristics of all included reception circuits as well as sensors, is performed to obtain a correct estimated angle, the occurrence of an error itself concerning a weight cannot be detected. When a calibration error occurs, for example, a deviation of the estimated angle from the actual incident angle of a reception signal occurs, requiring recalibration, etc. to be performed.

SUMMARY

According to an aspect of an embodiment, an angle estimating apparatus includes a receiving circuit configured to include a signal processor and plural receiving elements, and to use a weight set by calibration to weight respective signals incident to the plural receiving elements; an estimating circuit configured to estimate based on the respective signals weighted by the receiving circuit, an incident angle of the respective signals; a storing circuit configured to store a measured value of a mode vector reflecting characteristics of the receiving circuit in an error-free state of the weight for the characteristics of the receiving circuit, and to correlate and store the incident angle of the respective signals estimated by the estimating circuit and for the error-free state, a calculation result of an evaluation value by an evaluation function capable of calculating the evaluation value, which varies according to the incident angle of the respective signals and error; a detecting circuit configured to calculate the evaluation value based on the evaluation function and the measured value of the mode vector stored by the storing circuit, when the incident angle of the respective signals estimated by the estimating circuit is an angle corresponding to a value close to the incident angle of the respective signals stored by the storing circuit, and to detect occurrence of error, based on comparison of the evaluation value stored by the storing circuit and the calculated evaluation value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram depicting an example of hardware configuration of a signal processor;

FIG. 4 is a diagram depicting an example of application of the angle estimating apparatus to a radar apparatus of a vehicle;

FIG. 8 is a diagram (part 1) depicting an example of detection of an occurrence of calibration error; and FIG. 9 is a diagram (part 2) depicting an example of the detection of the occurrence of calibration error.

DESCRIPTION OF EMBODIMENTS

First to fourth embodiments of the present disclosure will be described in detail with reference to the accompanying drawings.

Figure 1:
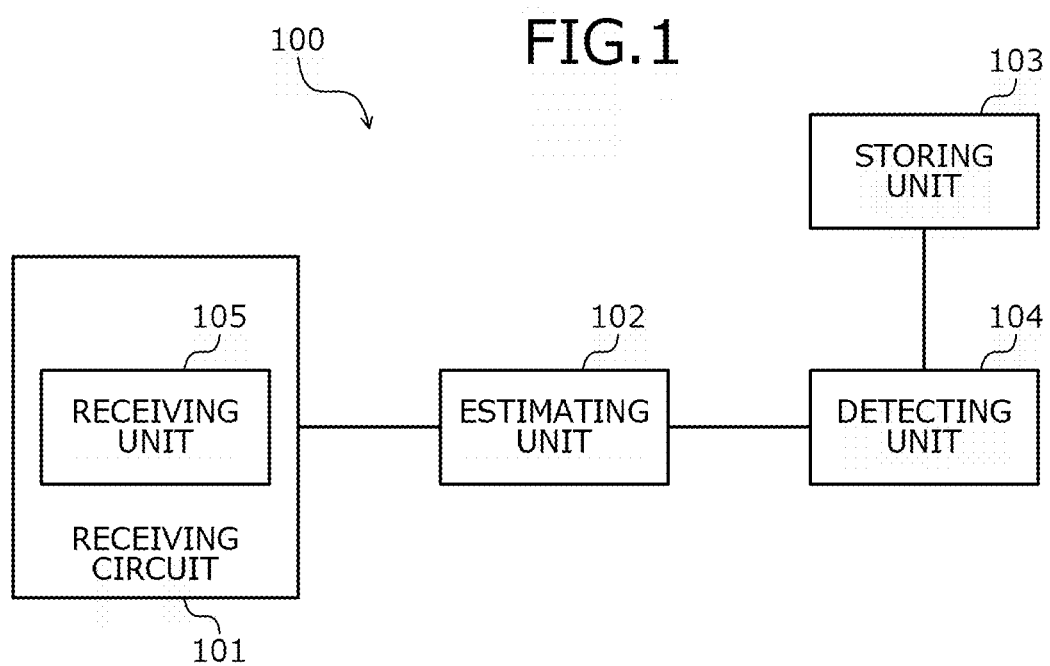
FIG. 1 is a block diagram of a functional configuration of an angle estimating apparatus according to a first embodiment.

FIG. 1 is a block diagram of a functional configuration of an angle estimating apparatus according to the first embodiment. An angle estimating apparatus 100 is used in an apparatus that uses ultrasonic waves, electromagnetic waves, light, etc. to search for, sense, measure the distance of, or measure the angle of an object. More specifically, the angle estimating apparatus 100 is used with sonar, radar, etc. The angle estimating apparatus 100 has a receiving circuit 101, an estimating unit 102, a storing unit 103, and a detecting unit 104. The receiving circuit 101 includes plural receiving units 105 and non-depicted amplifiers that amplify signals received by the receiving units 105. The receiving units 105, for example, are sensor arrays, antennas, etc.

The receiving circuit 101 includes, for example, an amplifier, a mixer, a filter, an analog to digital (A/D) converter, and a signal processing unit (SPU). The receiving circuit 101 uses a weight set by calibration, to weight signals incident to the receiving units 105. The signals are signals that are transmitted from a non-depicted transmitting unit and reflected by a target. Calibration, for example, is performed at the time of factory shipping.

The estimating unit 102 estimates the incident angles of the signals weighted by the receiving circuit 101. The storing unit 103 stores measured values of mode vectors (error-free mode vectors) reflecting characteristics of the receiving circuit 101 in a state when there is no error (hereinafter, "calibration error") of the weight for characteristics of the receiving circuit 101. Further, the storing unit 103 correlates and stores for the state when there is no calibration error, calculation results of evaluation values (reference values) calculated by the estimating unit 102 using an evaluation function and incident angles of signals.

The evaluation function is a function capable of calculating an evaluation value that varies according to the calibration error and the incident angle of the signals. The storing unit 103, for example, correlates and stores the evaluation value of a mode vector for case where the incident angle is 1 degree in a state when there is no calibration error, the calculation result (above reference value) for an evaluation value calculated by the evaluation function, and a one-degree incident angle estimated by the estimating unit 102. Hereinafter, a measured value of a (error-free) mode vector for a case where the incident angle is 1 degree in a state when there is no calibration error will be referred to as simply a measured value of a mode vector when there is no confusion. Further, the storing unit 103 may correlate and store calculation results for evaluation values corresponding to plural incident angles and plural incident angles.

The detecting unit 104 calculates an evaluation value based on the evaluation function and measured values of mode vectors stored by the storing unit 103, when the incident angle of the signals estimated by the estimating unit 102 is an angle corresponding to a value close to an incident angle of a signal stored by the storing unit 103. For example, an angle corresponding to a value close to an incident angle of a signal stored by the storing unit 103 may be the same angle as an incident angle of a signal stored by the storing unit 103 or a close angle. For example, the incident angle corresponding to a one-degree incident angle of a signal stored by the storing unit 103 is 1 degree or a close angle. A concrete definition of close is, for example, several a degrees with respect to the angle estimating resolution performance of the apparatus. Here, a is a value representing angle, not noise power.

The detecting unit 104 calculates the evaluation value (calculated value) based on an incident angle that corresponds to an incident angle of a signal stored by the storing unit 103, a measured value of a mode vector, and an evaluation function. The detecting unit 104 further detects the occurrence of calibration error, based on comparison of the calculated evaluation value and the evaluation value (reference values) stored by the storing unit 103. The detecting unit 104, for example, detects the occurrence of calibration error by the ratio of the calculated evaluation value and the evaluation value stored by the storing unit 103. For example, when rate of the calculated evaluation value and the evaluation value stored by the storing unit 103 differs from 1, the detecting unit 104 detects that calibration error has occurred.

Further, the estimating unit 102 estimates the incident angles of signals, based on signal spatial phase differences between the plural receiving units. More specifically, the estimating unit 102 estimates the incident angles of signals by Estimation of Signal Parameters via Rotational Invariance Techniques (ESPRIT).

The estimating unit 102 further calculates a covariance matrix of the signals weighted by the receiving circuit 101 and estimates the incident angles of signals, based on a spectral scanning process. Techniques of estimating the incident angle based on a spectral scanning process include Capon techniques, Multiple SIgnal Classification (MUSIC) techniques, prism techniques, and linear prediction (LP).

Figure 2:
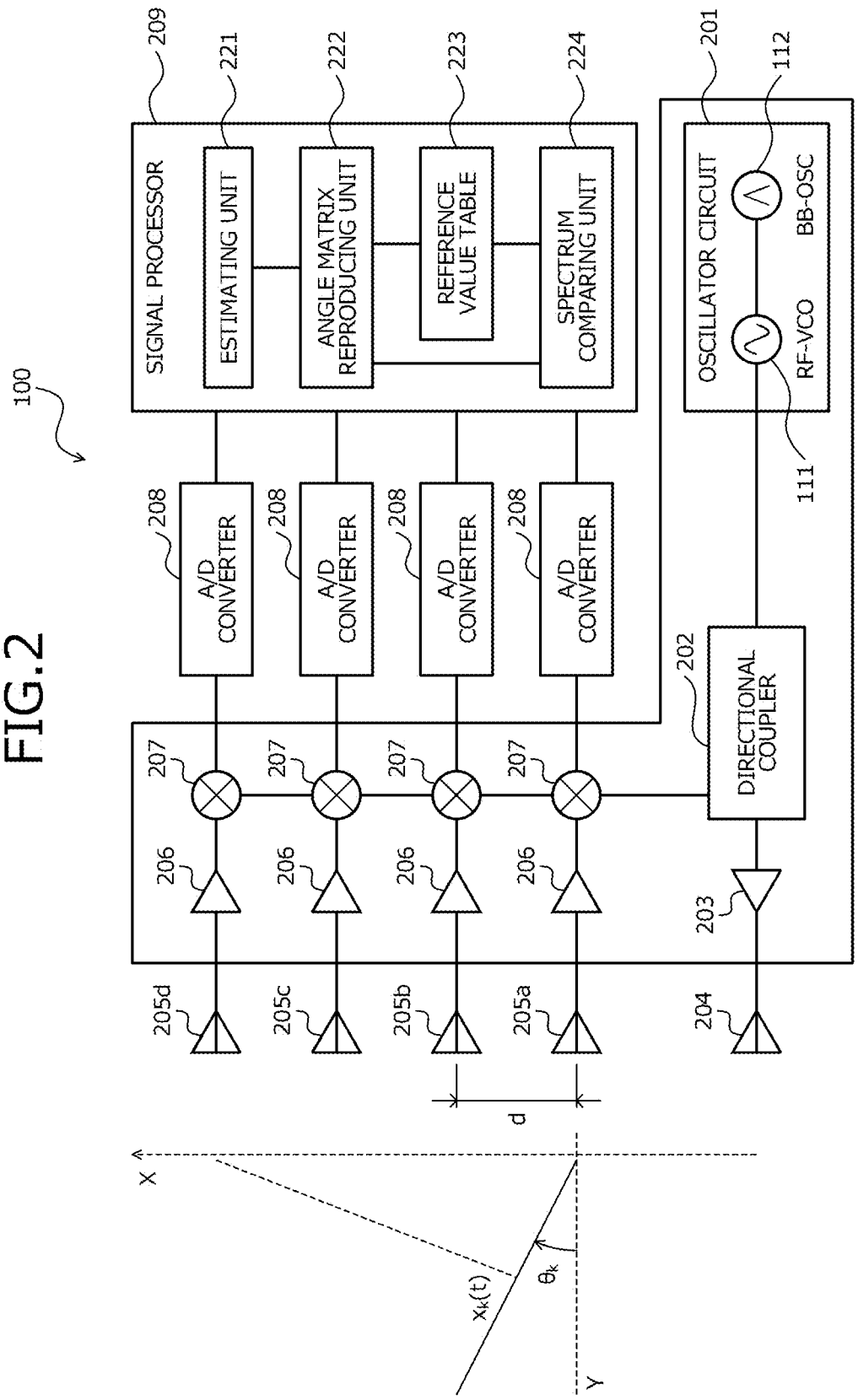
FIG. 2 is a diagram depicting an example of configuration of an angle estimating apparatus.

FIG. 2 is a diagram depicting an example of configuration of the angle estimating apparatus. The angle estimating apparatus 100 has an oscillator circuit 201, a directional coupler 202, a power amplifier 203, a transmission antenna 204, a reception antenna 205, a low noise amplifier 206, a mixer 207, an A/D converter 208, and a signal processor 209. Although a baseband circuit such as a low pass filter (LPF) is generally disposed between the mixer 207 and the A/D converter 208, to simplify the description, such components will not be described.

The oscillator circuit 201 has a radio frequency-voltage controlled oscillator (RF-VCO) 111 and a baseband-oscillator (BB-OSC) 112. The RF-VCO 111 is an oscillator that controls the oscillation frequency by voltage. The BB-OSC 112 obtains a frequency modulated continuous wave (FMCW) signal by adding a modulation signal to the RF-VCO 111 and performing frequency modulation, and outputs the FMCW signal to the directional coupler 202.

The directional coupler 202 outputs to the power amplifier 203 and the mixer 207, the signal output from the oscillator circuit 201. The power amplifier 203 amplifies the power of the signal output from the directional coupler 202 and outputs the signal to the transmission antenna 204. The transmission antenna 204 is a transmission sensor array having M (in this example, 1) sensor elements. The transmission antenna 204 transmits as a probe signal to a target sensing range, the signal output from the power amplifier 203.

The reception antenna 205 is a reception sensor array having N (in this example, 4) sensor elements. The reception antenna 205 receives reflected signals that, for example, are transmitted from the transmission antenna 204 and reflected by a target object such as a vehicle in front. The reception antenna 205 outputs the received signal to the low noise amplifier 206. The low noise amplifier 206 amplifies the signal output from the reception antenna 205 and outputs the signal to the mixer 207. The mixer 207 mixes the signal output from the low noise amplifier 206 and a signal output from the directional coupler 202, and outputs the mixed signal to the A/D converter 208.

The A/D converter 208 converts the analog signal output from the mixer 207 into a digital signal and outputs the digital signal to the signal processor 209. The signal processor 209 has an estimating unit 221, an angle matrix reproducing unit 222, a reference value table 223, and a spectrum comparing unit 224. The estimating unit 221 uses the signal output from the A/D converter 208, to estimate the distance, speed, angle, etc. of a target by a known technique, and outputs the estimation results to the angle matrix reproducing unit 222.

The angle matrix reproducing unit 222 uses the estimation results output from the estimating unit 221, to reproduce an angle matrix, and outputs the angle matrix to the reference value table 223 and the spectrum comparing unit 224. The reference value table 223 records error-free mode vectors and the angle matrix output from the angle matrix reproducing unit 222, updates reference values for determining calibration abnormalities, etc. The spectrum comparing unit 224 compares the matrix output from the angle matrix reproducing unit 222 and a reference value recorded in the reference value table 223 to determine whether a calibration error is present.

The receiving units 105 depicted in FIG. 1, for example, are realized by the reception antenna 205. Further, the receiving circuit 101 described in FIG. 1, for example, is realized by the low noise amplifier 206 and the mixer 207.

FIG. 3 is a diagram depicting an example of hardware configuration of the signal processor. As depicted in FIG. 3, the signal processor 209 includes a central processing unit (CPU) 301, memory 302, and an interface 303. The CPU 301, the memory 302, and the interface 303 are connected by a bus 309.

The CPU 301 governs overall control of the signal processor 209. The memory 302, for example, includes main memory and auxiliary memory. The main memory, for example, is random access memory (RAM). The main memory is used as a work area of the CPU 301. The auxiliary memory, for example, is non-volatile memory such as a magnetic disk, an optical disk, and flash memory. The auxiliary memory stores various types of programs operate the signal processor 209. Programs stored in the auxiliary memory are load onto the memory and executed by the CPU 301.

The interface 303 includes a user interface and a communications interface. The user interface, for example, includes an input device that receives operation input from a user and an output device that outputs information to the user. Further, the communications interface, for example, is an interface that communicates wirelessly or by a cable, with an external apparatus of the signal processor 209. The interface 303 is controlled by the CPU 301.

Functions of the estimating unit 102, the storing unit 103, and the detecting unit 104 depicted in FIG. 1 are realized by executing on the CPU 301, the programs stored in the memory 302. Depending on apparatus configuration, the receiving circuit 101 may be controlled. Further, functions of the estimating unit 221, the angle matrix reproducing unit 222, and the spectrum comparing unit 224 depicted in FIG. 2 are realized by executing on the CPU 301, the programs stored in the memory 302. Functions of the storing unit 103 depicted in FIG. 1 and the reference value table 223 depicted in FIG. 2 are implemented by the memory 302.

FIG. 4 is a diagram depicting an example of application of the angle estimating apparatus to a radar apparatus of a vehicle. As depicted in FIG. 4, the radar apparatus equipped on a vehicle 400 senses vehicles 401, 402 in front and measures the distance. For example, the vehicle 401 is located in front of the vehicle 400 at an angle of +θ. The vehicle 402 is located in front of the vehicle 400 at an angle of −θ.

The radar apparatus emits a probe signal in a target sensing range in front, receives the reflected signal returning from the vehicles 401, 402 after reflection, and estimates arrival angle (incident angle) of the reflected signal. Here, the radar apparatus (the angle estimating apparatus 100) of the present disclosure detects whether an error in the calibration (weight) used when estimating angle has occurred.

With reference to FIG. 2, principles of the angle estimation by the signal processor 209 will be described. To simplify description, the transmission antenna 204 count M is assumed to be 1 and the reception antenna 205 count N is assumed to be 4. The reception antenna 205 is assumed to be disposed in a straight line at equal intervals d along the X axis. The reception antenna 205 with such a configuration is called a uniform linear array (ULA).

K targets are present within a sensing range and when a probe signal transmitted from the transmission antenna 204 is reflected by each of the targets, these reflected RF echo signals are received by the reception antenna 205. The RF echo signals are assumed to be incident at mutually differing angles $\theta_k$ with respect to a direction (Y axis) orthogonal to the array axis as a 0 reference. In other words, an echo signal is a signal that estimates the arrival direction and thus, the arrival direction of an echo signal is the angle of a target.

In this case, an echo signal $v_n(t)$ obtained by mixing and demodulating the probe signal and the RF echo signal received by an n-th antenna can be expressed by equation (1), where a first reception antenna 205 is assumed to be a phase reference. Further, spatial phase φ can be expressed by equation (2). $g_n(\theta_k)$ represents characteristics of an n-th antenna element, $x_k(t)$ represents a baseband signal, $n_n(t)$ represents a noise signal, $\varphi_{n,k}$ represents a reception phase of an m-th wave at an element when an element 1 is a reference, λ represents the wavelength of the carrier wave, j represents an imaginary unit, and t represents time.

$$v_n(t) = \sum_{k=1}^{K} x_k(t) g_n(\theta_k) \exp(j\phi_{n,k}) + n_n(t) \quad (1)$$

$$\phi_{n,k} \equiv \frac{2\pi}{\lambda}(n-1)d\sin\theta_k \quad (2)$$

Written as a vector, equation (3) is obtained.

$$v(t) = \begin{bmatrix} \sum_{k=1}^{K} x_k(t) g_1(\theta_k) \exp(j\phi_{1,k}) + n_1(t) \\ \vdots \\ \sum_{k=1}^{K} x_k(t) g_N(\theta_k) \exp(j\phi_{N,k}) + n_N(t) \end{bmatrix} = Ax(t) + n(t) \quad (3)$$

Where, the relations indicated by equations (4), (5), and (6) exist.

$$A \equiv [a(\theta_1), \ldots, a(\theta_K)] = \begin{bmatrix} g_1(\theta_1)\exp(j\phi_{1,1}) & \ldots & g_1(\theta_K)\exp(j\phi_{1,K}) \\ \vdots & \ddots & \vdots \\ g_N(\theta_1)\exp(j\phi_{N,1}) & \ldots & g_N(\theta_K)\exp(j\phi_{N,K}) \end{bmatrix} \quad (4)$$

$$x(t) \equiv [x_1(t), \ldots, x_K(t)]^T \quad (5)$$

$$n(t) \equiv [n_1(t), \ldots, n_N(t)]^T \quad (6)$$

In equations (3) to (6), v(t) represents an output signal vector, x(t) represents a baseband vector, n(t) represents a noise vector $a(\theta_k)$ represents a mode vector (directional vector), and T represents transposition.

When a covariance matrix for v(t) is calculated from equation (3) when there is no correlation between x(t) and n(t), equation (7) is obtained.

$$R_{vv} = E\{v(t)v^H(t)\} = AR_{xx}A^H + \sigma^2 I \quad (7)$$

This a basic calculation target when angle estimation of a target is performed using an array antenna. More specifically, $R_{vv}$ is a basic target equation for estimating the arrival direction. In equation (7), $R_{vv}$ is an N×N covariance matrix. Further, in equation (7), E{•} represents an expected value (ensemble or time average), H represents a complex conjugate transpose, I represents a unit matrix, $\sigma^2$ represents variance (noise power) of a noise vector n(t), and $\sigma^2 I$ represents a noise vector covariance matrix. Where, $R_{xx}$ is a baseband signal covariance matrix defined by equation (8).

$$R_{xx} = E[x(t)x^H(t)] \quad (8)$$

In equation (8), $R_{xx}$ is K×K baseband signal covariance matrix. Hereinafter, time t is omitted.

Here, an echo signal is essentially coherent since an echo signal is a signal that is transmitted from the same signal source and is reflected by a target. Therefore, the relation of the covariance matrix rank (hereinafter, rank) and target count K is expressed by equation (9).

$$\text{rank}(R_{vv}) = \text{rank}(R_{xx}) < K \quad (9)$$

An angle vector a(θ) generated with θ as a parameter can be expressed by equation (10).

$$a(\theta) \equiv [g_1(\theta), \ldots, g_N(\theta) \exp[j\alpha(N-1)\sin(\theta)]]^T, \alpha = 2\pi d/\lambda \quad (10)$$

For example, in a Capon technique, an angle vector $P_{capon}(\theta)$ of equation (11) can be defined using an inverse matrix $R_{vv}^{-1}$ of $R_{vv}$ and equation (10). $P_{capon}(\theta)$ is calculated while parameter θ is varied and with the value of θ indicating the peak, can be used as angle information of the target.

$$P_{Capon}(\theta) = \frac{a^H(\theta)a(\theta)}{a^H(\theta)R_{vv}^{-1}a(\theta)} \quad (11)$$

Nonetheless, as is clear from equation (9), matrix $R_{vv}$ cannot be an inverse matrix. Therefore, in general, after performing a process called spatial averaging to restore the rank of $R_{vv}$, angle estimation from the inverse matrix or eigenvalue is performed (herein, $R_{vv}$ after spatial averaging will also be indicated as $R_{vv}$). Here, this technique will be briefly described.

(a) Forward spatial averaging: a Q×Q submatrix (N-Q+1 submatrices are possible) is taken along the direction of the principal diagonal of $R_{vv}$, summed and averaged.

(b) Backward spatial averaging: the reference point of the array is inverted and operations identical to those at (a) above are performed.

(c) Forward and backward spatial averaging: a technique that combines (a) and (b) above and that is generally used.

By using spatial averaging, the rank of $R_{vv}$ is restored and therefore, estimation of the angle of a target using the angle vector $P_{Capon}$, etc. becomes possible.

However, for example, as is clear from (a) above, extracting a submatrix from $R_{vv}$ and applying an averaging process means that characteristics $g_n(\theta_k)$ of the element antennas of equation (4) are reflected in the estimation accuracy of the angle of a target, in a calculated manner.

Thus, to prevent such effects, a correction process (calibration) of making the characteristics of all the element antennas in the radar field of view (FOV) roughly a constant value is performed. More specifically, angle estimation is performed taking some known angles as targets and correction coefficients for $g_n(\theta_k)$ are determined to minimize the difference of the actual values and the estimated values. As a result, the angle matrix after calibration can be expressed by equation (12).

$$A_0 \equiv [a_0(\theta_1), \ldots, a_0(\theta_K)] = \begin{bmatrix} \exp(j\phi_{1,1}) & \cdots & \exp(j\phi_{1,K}) \\ \vdots & \ddots & \vdots \\ \exp(j\phi_{N,1}) & \cdots & \exp(j\phi_{N,K}) \end{bmatrix} \quad (12)$$

In this state, if angle estimation is performed by an arbitrary technique, an estimated value at the best accuracy of the technique can be obtained. However, if calibration values stray consequent to temporal changes of the hardware during actual use of the apparatus, results are obtained indicating that the amplitude or phase of the arrival signals at the reception antennas 205 has changed. A major cause of calibration values straying is characteristics variation of a downstream RF circuit rather than characteristics variation of the reception antennas 205 and a calibration error C can be modeled as indicated by equation (13).

$$C \equiv \text{diag}[c_1, \ldots, c_N] \quad (13)$$

In other words, a reception signal w(t) when a calibration error occurs after calibration is first performed can be expressed by equation (14).

$$w(t) = C[A_0 x(t) + n(t)] \quad (14)$$

Here, estimation results obtained by an ESPRIT technique will be described. As described above, if angle estimation is performed in this state, the estimated value includes error. Thus, with reference to FIG. 5, calculation results in a case where angle estimation is performed by a quick(Q)-ESPRIT technique will be described. The Q-ESPRIT technique, for example, is the same technique as the "high-speed ESPRIT technique" recited in Japanese Laid-Open Patent Publication No. 2012-103132.

Figure 5:
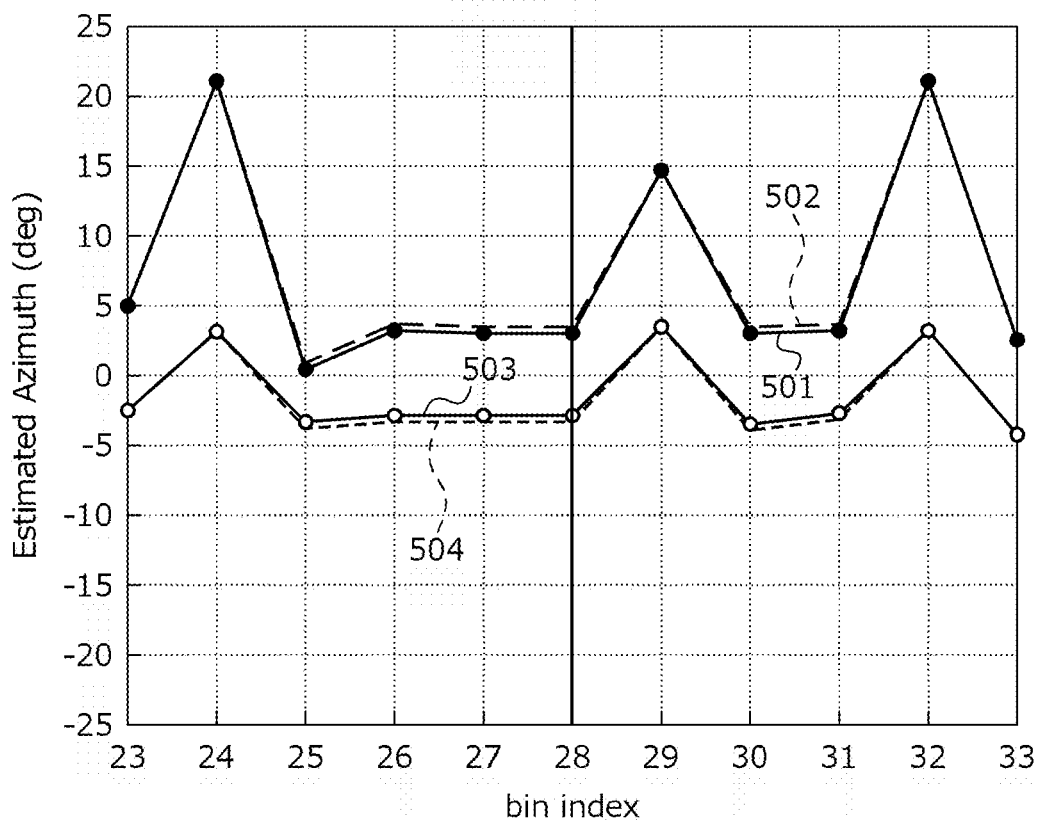
FIG. 5 is a diagram depicting calculation results in a case where angle estimation is performed by a Q-ESPRIT technique.

FIG. 5 is a diagram depicting calculation results in a case where angle estimation is performed by a Q-ESPRIT technique. In FIG. 5, the horizontal axis represents distance (bin index) and the vertical axis represents estimated angles (Estimated Azimuth). For example, the distance is assumed to be 20 m (28bin) and 2 targets having a speed of 0 km/h are assumed to be present at positions of angles ±3 degrees. The unit "bin" of the horizontal axis in FIG. 5 represents a separator (index) of Fast Fourier Transform (FFT) and corresponds to distance. 28bin, for example, corresponds to a distance of 20 m.

In FIG. 5, solid lines (curves 501, 503) indicate calculation results in a case of no calibration error. Broken lines (curves 502, 504) indicate calculation results in a case where a calibration error of −0.75 dB occurs at the reception antennas 205b, 205c.

More specifically, curve 501 indicates the calculation results for the targets at the positions of an angle of +3 degrees in a case of no calibration error Curve 502 indicates the calculation results for the targets at the positions of an angle of +3 degrees in a case where calibration error has occurred. Curve 503 indicates calculation results for the target at the position of an angle of −3 degrees in a case of no calibration error Curve 504 indicates the calculation results for the target at the position of angle of −3 degrees in a case where calibration error has occurred. As indicated by the difference in angles between curves 501 and 502 (or curves 503, 504) at 28bin in FIG. 5, the occurrence of a calibration error of a mere 0.75 dB results in an estimation error of about 0.5 degrees.

Here, estimation results by a PRISM technique and a MUSIC technique will be described.

Figure 6A:
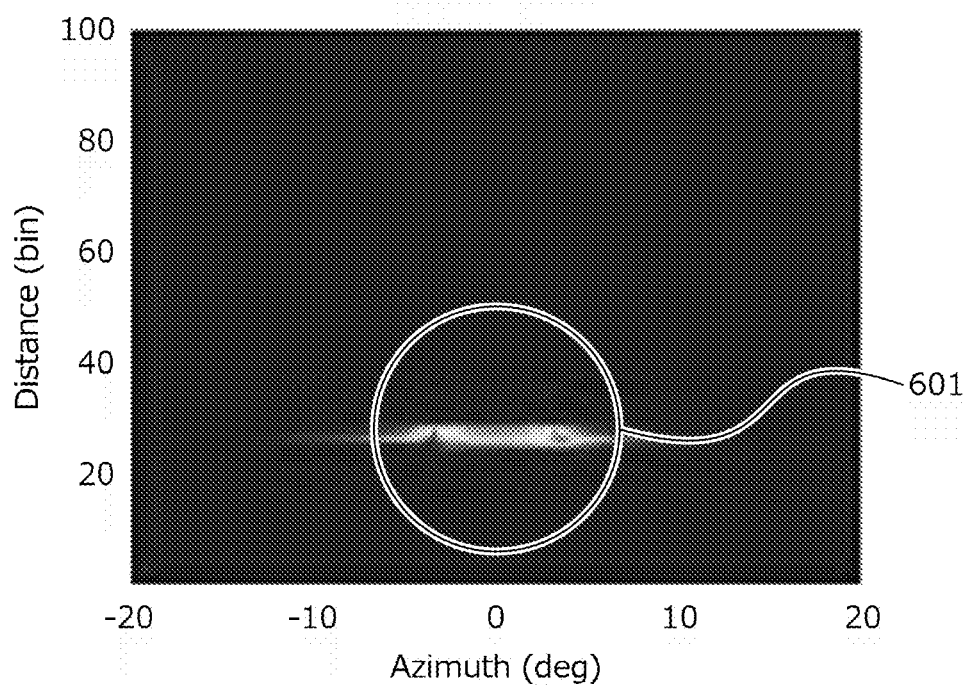
FIGS. 6A and 6B are diagrams depicting angular spectrum with respect to angle and distance in a case of two targets being present.
Figure 6B:
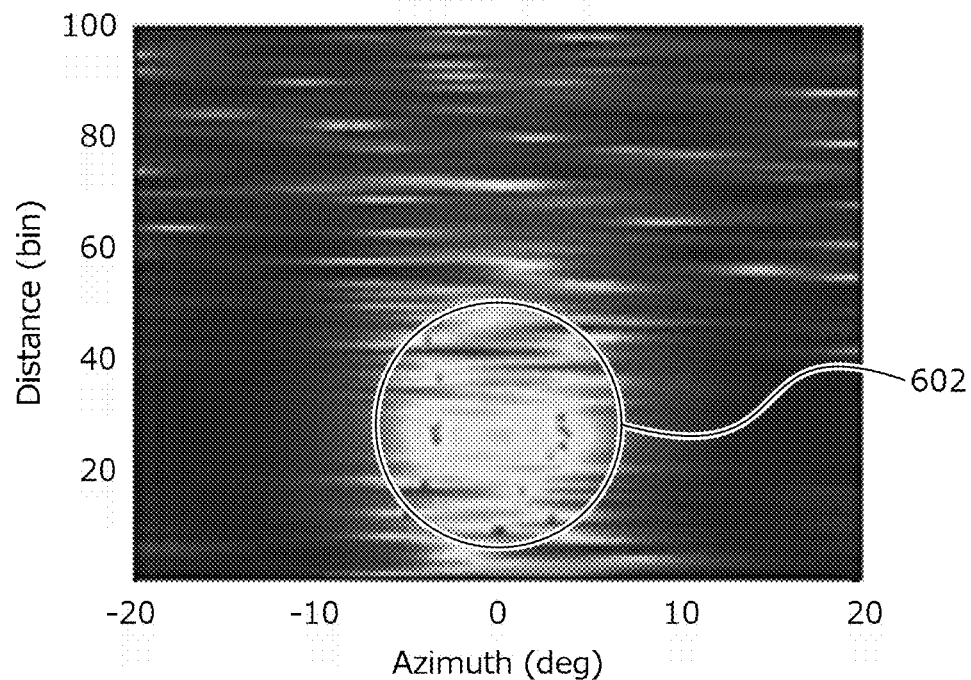

FIGS. 6A and 6B are diagrams depicting angular spectrum with respect to angle and distance in a case of 2 targets being present. In FIGS. 6A and 6B, similar to FIG. 5, for example, 2 targets having a speed of 0 km/h are assumed to be present at positions of a distance of 20 m (28bin) and angles of ±3 degrees. FIG. 6A depicts the angular spectrum calculated using a PRISM technique. FIG. 6B depicts the angular spectrum calculated using a MUSIC technique (forward-backward spatial smoothing (FBSS: forward-backward spatial averaging)-MUSIC technique). The horizontal axis in FIGS. 6A and 6B represents angle and the vertical axis represents distance.

In FIGS. 6A and 6B, when the angular spectrum concentrates at the 2 assumed target positions, i.e., the greater the extent to which the angular spectrum is displayed as points in a vicinity of the 2 targets, indicates that the arrival direction of the target has been estimated with high accuracy. In an area 601 in FIG. 6A, an angular spectrum is depicted ±3 degrees along the horizontal axis and in a vicinity of 28bin on the vertical axis. In an area 602 in FIG. 6B, an angular spectrum is depicted ±3 degrees along the horizontal axis and in a vicinity of 28bin on the vertical axis.

Figure 7:
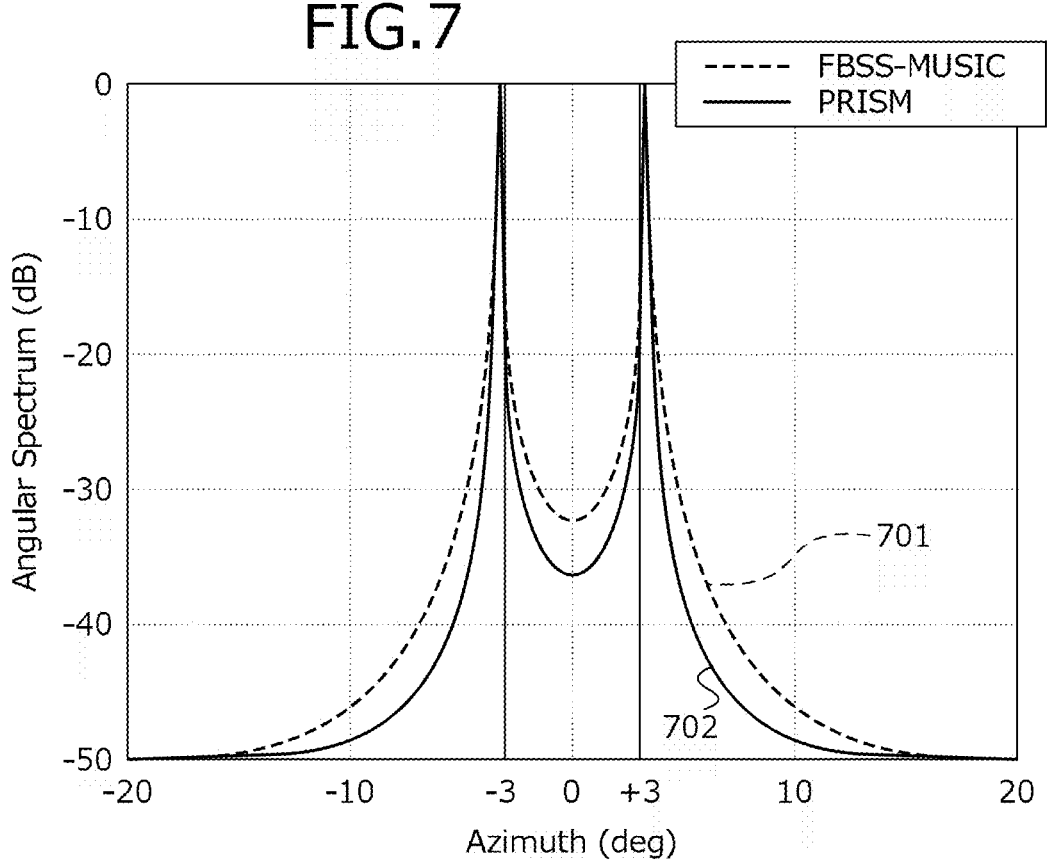
FIG. 7 is a diagram depicting the angular spectrum when distance is constant.

In FIGS. 6A and 6B, the occurrence of error is difficult to assess and therefore, in FIG. 7, at the distance at which the targets are present, angular spectra (a), (b) depicted in FIGS. 6A and 6B are cross-sectioned from a top portion of the paper to a bottom portion and depicted, where the horizontal axis represents angle (similar to FIGS. 6A, 6B) and the vertical axis represents spectrum (Z axis in FIG. 6A, 6B). FIG. 7 is a diagram depicting the angular spectrum when the distance is constant. In FIG. 7, curves 701, 702 indicate calculation results by each technique in a case where 2 targets are placed at positions of ±3 degrees, 20 m from the radar. More specifically, curve 701 indicates calculation results by a MUSIC technique. Curve 702 indicates calculation results by a PRISM technique. In both curves 701, 702, the peaks deviate from the positions of ±3 degrees and the occurrence of estimation error is clear.

To detect the occurrence of calibration error by signal processing during operation of the apparatus, an evaluation function $f(C,\theta)$ is used where the value for angle $\theta$ varies in response to only calibration error C. On the other hand, after calibration at the time of factory shipping, a measured value of error-free mode vector $a_0(\theta)$ and calculated values (reference value $f(I,\theta_m)$) of an evaluation function for angles $\theta_m$ (m=1 to M) within the FOV (radar field of view) are respectively stored.

When angle output $\theta_k$ near angle $\theta_m$ is obtained during operation, the calculated value $f(C,\theta_k)$ of evaluation function $f(C,\theta)$ is calculated and compared with reference value $f(I,\theta_m)$. If the difference exceeds a predetermined threshold, calibration error is determined to have occurred. In evaluation function $f(C,\theta)$, the value of calibration error C is not input or derived. When calibration error occurs, a warning is given, correction operation is attempted, etc.

In the first embodiment, a derivation method of an evaluation function in a case where the Q-ESPRIT technique is used will be described. By equation (15), a subvector is obtained (refer to equation (14)), where w is a reception signal vector when calibration error has occurred. In the description hereinafter, noise components will be disregarded to simplify description.

$$w_1 = J_1 Cv;\ J_1 = [I_3 0] \in R^{3\times 4}$$

$$w_2 = J_2 Cv;\ J_2 = [0 I_3] \in R^{3\times 4} \quad (15)$$

Here, since the reception antenna 205 count is assumed to be 4, $w_1$ and $w_2$ are signals from subarrays (reception antennas 205a to 205c) and (reception antennas 205b to 205d). In the extreme, if C elements are not far from 1, the rotation invariant relation of equation (16) is established between the 2 subarrays, which are basic premises of the ESPRIT technique.

$$J_2 CA_0 = J_1 CA_0 \overline{\Phi}$$

$$\Rightarrow \overline{\Phi} = \mathrm{diag}[\delta_1 \exp(j\overline{\Phi_1})\ \delta_2 \exp(j\overline{\Phi_2})\ \delta_3 \exp(j\overline{\Phi_3})],\ \overline{\Phi_k} = \frac{2\pi d}{\lambda}\sin(\overline{\theta_k})$$

(16)

Thus, as indicated below, if $J_1 CA_0$ is QR decomposed, equation (16) can be rewritten as equation (17).

$$J_1 CA_0 = \overline{QR} \rightarrow J_2 CA_0 = J_1 CA_0 \overline{\varphi} = \overline{QR\varphi} \quad (17)$$

Here, by calculating $U_1^{-1}U_2$ from the next 2 matrices and performing eigenvalue decomposition, V and $\Omega$ are obtained as indicated by equation (18).

$$U_1 \equiv w_1 w_1^H = \overline{QR} R_{xx} (\overline{QR})^H$$

$$U_2 \equiv w_1 w_2^H = \overline{QR} R_{xx} (\overline{QR\varphi})^H$$

$$U_1^{-1} U_2 = (\overline{QR})^{-H} R_{xx}^{-1} (\overline{QR})^{-1} \overline{QR} R_{xx} (\overline{QR\varphi})^H = (\overline{QR})^{-H} \overline{\varphi}^H (\overline{QR})^H = V\Omega V^H \quad (18)$$

This is an algorithm of the Q-ESPRIT technique when calibration error is present.

An evaluation function in the Q-ESPRIT technique can be derived in the following manner. By referring to equations (17) and (18), it is clear that an angle matrix CA that includes calibration error can be reproduced as indicated by equation (19). Since this is simply as might be expected, description will be omitted, however, the angle matrix including the error indicated here is one example.

$$J_1 CA_0 = \overline{QR} = V^{-H} \rightarrow CA_0 = \begin{bmatrix} LV^{-H} \\ V^{-H}\Omega^H \end{bmatrix},\ L = [0_{1\times 2}\ 1] \quad (19)$$

$$\therefore CA_0(CA_0)^H = C(A_0 A_0^H)C^H$$

By using the error-free mode vector $a_0(\theta)$ and equation (19), evaluation function $f(C,\theta)$ indicated by equation (20) can be obtained. Here, evaluation function $f(C,\theta)$ indicated by equation (20) is a function expressed using a matrix W that is based on a combination of matrices V, $\Omega$ obtained by decomposing into eigenvalues, a given matrix $U_1^{-1}U_2$ (refer to equation (18)) obtained when angle estimation is performed at the estimating unit 102 depicted in FIG. 1. In the Q-ESPRIT technique, since angle estimation is performed fixing rank $(R_{vv})=N-1$, when N=4, 3 estimated angles are obtained.

$$f(C,\theta) = a_0^H(\theta) C(A_0 A_0^H) C^H a_0(\theta) \rightarrow f(C,\theta) = a_0^H(\theta)(WW^H)a_0(\theta) \quad (20)$$

As an angle of a target, when an estimated value that is $\theta_k$ is obtained, a value $(C,\theta_k)$ of evaluation function $f(C,\theta)$ corresponding to $\theta_k$ is calculated using equation (20). The calculated value $f(C,\theta_k)$ and a reference value $f(I,\theta_m)$ are compared and if the difference, ratio, etc. exceeds a predetermined threshold, it can be determined that calibration error has occurred. In other words, the reference value $f(I,\theta_m)$ (I=unit matrix) of the evaluation function for angle $\theta_m$ calculated stored in a state of no calibration error and the value $f(C,\theta_k)$ of the evaluation function calculated when an arrival angle $\theta_k$ near $\theta_m$ is detected are compared.

Evaluation function $f(C,\theta)$ responds to arrival angle and calibration error and therefore, the occurrence of calibration error can be detected by comparison of $f(I,\theta_m)$ and $f(C,\theta_k)$. The reference value $f(I,\theta_m)$, similar to the calculated value $f(C,\theta_k)$, is a value calculated by the Q-ESPRIT technique.

Based on equation (20), equation (21) clearly holds. The magnitude of calibration error is estimated using a diagonal element of matrix: $C(A_0A_0^H)C^H$ and an error-free mode vector $a_0(\theta_k)$. Here, the detecting unit 104 depicted in FIG. 1 can detect based on a value related to the difference obtained from the diagonal element of $WW^H$ in equation (20), the receiving unit 105 (reception antenna 205) at which error occurred. More specifically, the error related value, for example, is $|c_1|^2$ to $|c_4|^2$ in equation (21).

$$\mathrm{diag}[(WW^H)]=[|c_1|^2\Sigma_{k=1}^K|a_{1k}|^2,\ldots,|c_4|^2\Sigma_{k=1}^K|a_{4k}|^2] \quad (21)$$

As indicated by the terms on the right-hand side of equation (21), the diagonal element of $WW^H$ is proportional to the square of the calibration error. The right-hand terms $|c_1|^2$ to $|c_4|^2$ are all 1 when there is no calibration error. On the other hand, when there is calibration error, none of the values of $|c_1|^2$ to $|c_4|^2$ is 1.

Therefore, among $|c_1|^2$ to $|c_4|^2$, for example, that which does not become 1, that for which a difference (e.g., mathematical difference) from 1 is greater than or equal to a threshold, those that are clearly different from another value, etc. can be identified as a reception antenna 205 at which calibration error has occurred. Notification of the identified reception antenna 205 is given, which can be useful in recalibration at the time of maintenance.

The detecting unit 104 depicted in FIG. 1 further detects an amplitude component of the calibration error, based on the square root of the value ($|c_1|^2$ to $|c_4|^2$) related to the calibration error. More specifically, the detecting unit 104 calculates the square root of $|c_1|^2$ to $|c_4|^2$ for which calibration error has occurred and is thereby, able to detect an amplitude component of the calibration error. Notification of the amplitude component of the calibration error is given, which can be useful in recalibration at the time of maintenance.

Calibration error detection that takes phase error into consideration will be described. The effects of calibration errors on angle estimation tend to be more serious for amplitude components than for phase components. Nonetheless, a large calibration error also causes problems concerning phase components. Here, the detecting unit 104 depicted in FIG. 1 detects a value of the error based on a matrix W and generalized inverse matrix of angle matrix $A_0=[a_0(\theta_1),\ldots,a_0(\theta_k)]$. As indicated by equation (22), from the right side of matrix $CA_0$ (=W) of equation (19), multiplication by a generalized inverse matrix (superscript "+" of $A_0$ indicates a generalized inverse matrix) of $A_0$, a value of the calibration error C that also includes phase error can be obtained directly. A generalized inverse matrix is also called a pseudomatrix.

$$W=CA_0, WA_0^+=CA_0A^+=C \quad (22)$$

Thus, a value of the calibration error C can be obtained.

FIG. 8 is a diagram (part 1) depicting an example of the detection of the occurrence of calibration error. The graph in FIG. 8 depicts an example of detection of the occurrence of calibration error when equation (20) is used. In FIG. 8, the horizontal axis represents angle and the vertical axis represents angular correlation. In curve 801 of FIG. 8, the angular correction value corresponding to a position $\theta_m$ on the horizontal axis indicates the value $f(I,\theta_m)$ of the evaluation function corresponding to the true angle $\theta_m$ in an error-free state.

On the other hand, curve 802 indicates the angular correlation when calibration error occurs. For a true angle $\theta_m$, the value $f(C,\theta_k)$ of the evaluation function of an arrival angle $\theta_k$ estimated after the occurrence of the calibration error C is a low value compared to the reference value. For curve 802, the level shifts above/below curve 801 corresponding to whether the calibration error is positive/negative. The angle estimating apparatus 100 determines that calibration error has occurred when the difference between curves 801 and 802 exceeds a threshold.

In this manner, from a reception signal obtained during operation, the angle estimating apparatus 100 compares the calculated value $f(C,\theta_k)$ obtained by evaluation function $f(C,\theta)$ for which the value for angle $\theta$ varies in response to the calibration error C and the reference value $f(I,\theta_m)$ for an error-free state. Therefore, the occurrence of calibration error can be detected autonomously during operation of the angle estimating apparatus 100. More specifically, even in a state where the actual arrival angle of a reception signal is unknown, the occurrence of calibration error can be detected.

Further, when calibration error occurs, a warning may be given, whereby the user can be prompted to correct (repair) the calibration error. Further, when calibration error occurs, for example, a correction process may be performed using the units described above or hereinafter. As a result, drops in the estimation accuracy of arrival angles by the angle estimating apparatus 100 can be suppressed.

The second embodiment of the angle estimating apparatus 100 will be described. In the first embodiment, estimation of calibration error by an ESPRIT technique is described. In the second embodiment, estimation of calibration error by a spectral scanning technique will be described. In the second embodiment, parts differing from the first embodiment will be described.

An evaluation function in spectral scanning techniques such as a Capon technique, a MUSIC technique, a prism technique, and an LP technique can be derived as follows. For example, when calibration error occurs, equation (10) becomes a different equation that includes calibration error.

Here, when calibration error is not present, the storing unit 103 depicted in FIG. 1 stores a measured value $b_0(\theta_m)$ of the mode vector for each angle and the incident angle $\theta_m$ (m=1 to M) of each signal estimated by the detecting unit 104. Since the mode vector can be modeled using characteristics for the angle $\theta$ of respective antenna elements as indicated by equation (23), a model $b(\theta)$ of the mode vector is generated using previous data $b_0(\theta_m)$ and is similarly stored in the storing unit 103. g is the overall characteristics of the receiving circuit 101 (more specifically, analog circuits from the reception antennas 205a to d to the A/D converter 208 in FIG. 2).

Further, when the incident angle estimated by the estimating unit 102 during operation is an angle close (defined above) to incident angles of signals stored in the storing unit 103, the detecting unit 104 substitutes the estimated angle into the mode vector model above. The detecting unit 104 generates an angle matrix $W^-[b(\theta_1),\ldots,b(\theta_k)]$ and uses this and a mode vector model $b_0(\theta)$ obtained in an error-free state to calculate a value of an evaluation function defined by equation (24). Naturally, $\theta$ in equation (24) is a variable.

$$b(\theta_m)[g_1(\theta_m)\exp(j\varphi_{1,m}),\ldots,g_N(\theta_m)\exp(j\varphi_{N,m})]^T \quad (23)$$

$$W\equiv[b(\theta_1),\ldots,b(\theta_1)]\rightarrow f(C,\theta)=b_0^H(\theta)(WW^H)b_0(\theta) \quad (24)$$

The value $f(C,\theta_k)$ calculated when an arrival angle $\theta_k$ close to $\theta_m$ is detected can be calculated using the evaluation function $f(C,\theta)$ indicated by equation (24). The value of the calculated value $f(C,\theta_k)$ and the reference value $f(I,\theta_m)$ are compared and when the difference exceeds a predetermined threshold, it can be determined that calibration error has occurred. The reference value f(I,θ$_m$) is a value calculated by a spectral scanning technique like the calculated value f(C,θ$_k$).

FIG. 9 is a diagram (part 2) depicting an example of the detection of the occurrence of calibration error. The graph in FIG. 9 depicts an example of calibration error detection using equation (24). In FIG. 9, the horizontal axis represents angle and the vertical axis represents angular correlation. Curve 901 in FIG. 9 indicates error-free values (reference values). On the other hand, curve 902 depicts a case where calibration error occurs. For curve 902, the level shifts above/below curve 901 corresponding to whether the calibration error is positive/negative. When the difference of the curves 901 and 902 at angle θ$_k$ in a vicinity of angle θ$_m$ exceeds a threshold, calibration error is determined to have occurred.

In this manner, even with a spectral scanning technique, the occurrence of calibration error can be detected by comparing the calculated value f(C,θ$_k$) obtained by the evaluation function f(C,θ) and the reference value f(I,θ$_m$) for an error-free state. Thus, effects identical to those of the first embodiment can be obtained by the second embodiment.

The angle estimating apparatus 100 of the third embodiment will be described. In the third embodiment, calibration error detection that takes phase error into consideration will be described. In the third embodiment, parts differing from the first and second embodiments will be described.

The detecting unit 104 depicted in FIG. 1 extracts from among the output signals of the reception antennas 205, a combination of 2 signals originating from mutually different antennas. For each combination, the detecting unit 104 calculates the spatial phase between the 2 signals, based on the interval of the receiving units 105 (reception antennas 205) making up the combination and an estimation result calculated by the estimating unit 102 using the 2 signals obtained from the combination. The detecting unit 104 further detects the occurrence of error in the weight for the characteristics of the receiving circuit 101, based on the difference (spatial phase difference) calculated for each combination.

More specifically, from among arriving signals received by N reception antennas 205, respective signals of 1 set (2 mutually different antennas) are extracted and the spatial phase between signals arriving at each mono-pulse radar is calculated as the mono-pulse radar of $_NC_2$ set. Phase components of an error matrix (refer to equation (13)) can be estimated from the phase deviation of each set. More specifically, equation (25) is obtained for phase difference $z_r$ by identifying the methods of combining (p,q) by a suitable number r=1 . . . $_NC_2$, where an angle of a target obtained from a mono-pulse radar having p-th and q-th antennas (where, the antenna interval is assumed to be d$_{pq}$, and α$_{pq}$=d$_{pq}$/λ) is assumed to be χ$_{pq}$ (needless to say, when there are plural targets, χ$_{pq}$ is a vectoral composite value of the angle of each target).

$$z_r = \frac{w_p(t) - w_q(t)}{w_p(t) + w_q(t)} \approx -j\tan[\pi\alpha_r\sin(\chi_r)] \quad (25)$$

α$_r$ is a constant defined by d$_r$ and therefore, equation (26) is obtained concerning phase.

$$\sin(\chi_r) = \frac{1}{\pi\alpha_r}\tan^{-1}[-\text{imag}(z_r)] \quad (26)$$

Equation (26) is obtained for $_NC_2$ sets. If there is no calibration error, each χ$_r$ should take on the same value. Therefore, if χ$_r$ deviate from one another, phase error (calibration error) is determined to have occurred. Here, for example, by substituting parameter vector φ, defining an evaluation function ε (C;φ) by equation (27), and obtaining as a least squares problem, a value of φ that minimizes the equation, the solution is an estimated value of the phase error. In equation (27), one example of expansion is depicted.

$$\varepsilon(C;\phi) = \frac{1}{N^{C_2}} \sum_{\substack{r=1,r'=1 \\ r \neq r'}}^{N^{C_2}} |\sin(x_r) - \sin(x_{r'}) + \phi_r|^2 = \quad (27)$$

$$\frac{1}{6}\{|\sin(x_1) - \sin(x_2) + \phi_1|^2 + |\sin(x_2) - \sin(x_3) + \phi_2|^2 +$$

$$|\sin(x_3) - \sin(x_4) + \phi_3|^2 + |\sin(x_4) - \sin(x_5) + \phi_4|^2 +$$

$$|\sin(x_5) - \sin(x_6) + \phi_5|^2 + |\sin(x_6) - \sin(x_1) + \phi_6|^2\}$$

From equation (27), phase error in calibration error can be detected. According to the third embodiment, the occurrence of calibration error (phase error) during operation of the angle estimating apparatus 100 can be detected autonomously. More specifically, even in a state where the actual arrival angle of a reception signal is unknown, phase error can be detected by such operations as above.

The angle estimating apparatus 100 of the fourth embodiment will be described. In the fourth embodiment, detection of calibration error using a noise-specific vector E$_n$ will be described. In the fourth embodiment, parts differing from the first to third embodiments will be described.

The detecting unit 104 depicted in FIG. 1 calculates an evaluation value by an evaluation function, based on a measured value of a mode vector stored by the storing unit 103, when an incident angle of signals estimated by the estimating unit 102 is a given incident angle (e.g., θ$_k$). The evaluation function is a function that can calculate an evaluation value that varies according to the incident angle of signals and the calibration error.

The evaluation function is expressed by the matrix W (for example, refer to equation (20)) and a matrix E$_n$ (for simplicity, indicated as "noise-specific vector" hereinafter) composed of noise-specific vectors obtained by applying the MUSIC technique for incident angles θ$_m$ (m=1 to M) in a state free of weight error.

The matrix W, for example, is a matrix based on a measured value of a mode vector stored by the storing unit 103 and a function that can calculate an evaluation value that varies according to the incident angle of signals and the calibration error. The matrix W, for example, can be expressed by equation (28). V is a matrix obtained from eigenvectors that decompose into eigenvalues, a given matrix (e.g., U$_1^{-1}$U$_2$ (refer to equation (18))) that is used when angle estimation is performed at the estimating unit 102. Ω represents eigenvalues of the given matrix (e.g., U$_1^{-1}$U$_2$).

Further, for example, L is a vector that similar to J$_1$ and J$_2$, extracts a specific element from a matrix (refer to equation (16)). 0$_1$x$_2$ representing L represents 1-row, 2-column row vector; 1 represents the scalar (The column count of L is defined to be equivalent to the row count of V$^{-H}$, and the value of only one column is 1. In this example, the final element is indicated as 1). Further, for example, L can be expressed by $0_m x_n$, which represents an m-row, n-column row vector. In this case, the value of only one column may be 1, or the value of only one column may be a value other than 1.

$$W = \begin{bmatrix} LV^{-H} \\ V^{-H}\Omega^H \end{bmatrix} (L = [0_{1\times 2}, 1]) \quad (28)$$

For example, the matrix W can be a matrix that is based on a combination V,Ω of plural matrices obtained when a given matrix $U_1^{-1}U_2$ (refer to equation (18)) used when the incident angle of signals is estimated based on the spatial phase difference of signals at the receiving units 105. Further, the matrix W can be an angle matrix defined by equations (23) and (24) in the second embodiment.

The evaluation function in the present embodiments is defined by an equation for which $f(C,\theta)=E_n W^H$. The detecting unit 104 detects the occurrence of calibration error, based on the evaluation function, the noise-specific vector $E_n$, and the matrix W.

The detecting unit 104 may obtain from the storing unit 103, a noise-specific vector $E_n$ pre-stored in the storing unit 103, when the incident angle of signals estimated by the estimating unit 102 is a given incident angle. Further, the detecting unit 104 may calculate the noise-specific vector $E_n$, when the incident angle of signals estimated by the estimating unit 102 is a given incident angle.

More specifically, in the fourth embodiment, the noise-specific vectors $E_n$ are obtained using the MUSIC technique for the matrix $W(=A_0)$ and angles m (m=1 to M) after calibration, and are stored. A noise-specific vector $E_n$ is a value calculated in a calibration error-free state. Further, a noise-specific vector $E_n$, for example, is a value that can be calculated only when the difference of "the reception antenna 205 count" less "the signal count" is 1 or greater. The signal count is the number of targets. For example, when there are 4 of the reception antennas 205, the noise-specific vector $E_n$ is a vector that can be calculated when the target count is 3 or less.

A noise-specific vector $E_n$ is a noise-specific vector calculated using a MUSIC technique. The MUSIC technique is a technique of applying eigenvalue decomposition to a signal covariance matrix, expressing the matrix by vectors spanning signal-specific space and vectors spanning noise-specific space, and performing angle estimation of a target using the orthogonality of signal subspace and noise subspace.

In equation (29), a relational expression obtained by decomposing the signal covariance matrix $R_{vv}$ into eigenvalues is indicated. $E_s$ is a matrix having as elements, eigenvectors spanning the signal subspaces; $E_n$ is a matrix having as elements, vectors spanning the noise subspaces; $\Lambda_s$ is an eigenvalue between signal subspaces; and $\sigma^2$ is the noise power. In equation (29), v represents arrival signals, s represents signals, and n represents noise.

$$R_{vv} = E_s \Lambda_s E_s^H + \sigma^2 E_n E_n^H \quad (29)$$

Here, as known, the matrix $E_s$ of vectors spanning the signal subspaces is parallel to the signal angle matrix, i.e., $E_s // A_0$. On the other hand, since $E_s \perp E_n$ is true, $E_n \perp A_0$ is true and accordingly, when no calibration error is present, $E_s E_n = 0$ is true. Therefore, when no calibration error is present, $f(I,\theta) = E_n W^H = E_n A_0^H = 0$. On the other hand, when calibration error has occurred, $f(C,\theta) = E_n W^H = E_n CA^H \neq 0$. In this manner, calibration error can be detected according to whether $f(C,\theta)$ is 0.

According to the fourth embodiment, the occurrence of calibration error can be detected autonomously during operation of the angle estimating apparatus 100. More specifically, even in a state where the actual arrival angle of a reception signal is unknown, the occurrence of calibration error can be detected.

According to one aspect, the occurrence of calibration error can be detected.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An angle estimating apparatus for estimating an angle between vehicles comprising:
   a receiving circuit, including a signal processor and a plurality of receiving elements, that receives respective signals transmitted from a transmitting device and reflected by a vehicle, configured to use a weight to weigh the respective signals relative to characteristics of the plurality of receiving elements, wherein the weight is set by a calibration process and the respective signals are at least one of ultrasonic signals, electromagnetic signals, or frequency modulated continuous wave signals;
   an estimating circuit configured to estimate an incident angle of the respective signals relative to the vehicle using the weight of the respective signals;
   a storing circuit configured to store a measured value of a mode vector reflecting characteristics of the receiving circuit the incident angle of the respective a reference value for an evaluation value that varies according to at least the incident angle of the respective signals; and
   a detecting circuit configured to calculate the evaluation value based on an evaluation function and the measured value of the mode vector stored by the storing circuit, when the incident angle of the respective signals estimated by the estimating circuit is an angle corresponding to a value within a predefined degree of the incident angle of the respective signals stored by the storing circuit, and to correct a calibration error when it has been determined by the detecting circuit that an error occurred when a ratio of the evaluation value stored by the storing circuit and the calculated evaluation value differs from a predefined value.

2. The angle estimating apparatus according to claim 1, wherein
   the estimating circuit estimates the incident angle by using a spatial phase difference between the respective signals at the plurality of receiving elements, and
   the evaluation function is a function (equation (30)) defined using a matrix W generated by a combination of a plurality of matrices obtained by decomposing into eigenvalues, a given matrix used for angle estimation at the estimating circuit, $$f(C,\theta)=a_0^H(\theta)(WW^H)a_0(\theta) \quad (30)$$

where, in equation (30), C represents the error, θ represents the incident angle estimated by the estimating circuit, $a_0(\theta)$ represents the mode vector, and H represents complex conjugate transpose.

3. The angle estimating apparatus according to claim 2, wherein
the detecting circuit detects a receiving element at which the error occurred among the plurality of receiving elements, based on a value related to the error and obtained from a diagonal element of $WW^H$ in equation (30).

4. The angle estimating apparatus according to claim 3, wherein
the detecting circuit detects an amplitude component of the error, based on a value related to the error.

5. The angle estimating apparatus according claim 2, wherein
the detecting circuit detects a value of the error, based on the matrix W of equation (30) and a generalized inverse matrix of an angle matrix $A_0=[a_0(\theta_1), \ldots, a_0(\theta_k)]$.

6. The angle estimating apparatus according to claim 1, wherein
the receiving circuit includes an amplifier configured to amplify the respective signals received by the plurality of receiving elements, a mixer configured to modulate the respective signals output from the amplifier, an analog-to-digital converter configured to convert output from the mixer into a digital signal, and the signal processor,
the estimating circuit estimates the incident angle of the respective signals, based on scanning of an angular spectrum of the respective signals weighted by the receiving circuit,
the storing circuit generates and stores a mode vector model $b(\theta_m)$ (equation (31), where the angle is treated as a variable) by using the measured value $b_0(\theta_m)$ of the mode vector based on the incident angle $\theta_m$ (m=1 to M) of the respective signals estimated by the estimating circuit,
the detecting circuit substitutes the estimated angle $\theta_k$ for $\theta_m$ in the mode vector model $b(\theta_m)$, generates an angle matrix $W=[b(\theta_1), \ldots, b(\theta_k)]$, and calculates the evaluation value based on the evaluation function (equation (32)), when the incident angle estimated by the estimating circuit is the angle within a predefined degree of the incident angle $\theta_m$ of the respective signals stored by the storing circuit, $$b(\theta_m)=[g_1(\theta_m)\exp(j\phi_{1,m}), \ldots, g_N(\theta_m)\exp(j\phi_{N,m})]^T \quad (31)$$

$$f(C,\theta)=b_0^H(\theta)(WW^H)b_0(\theta) \quad (32)$$

where, in equation (31), θ represents the incident angle estimated by the estimating circuit, g represents overall characteristics of the receiving circuit, which is an analog circuit from the plurality of receiving elements to the analog to digital converter, j represents an imaginary unit, φ represents spatial phase, and T represents transpose; in equation (32), C represents the error, $b_0(\theta)$ represents the mode vector, W represents the angle matrix, and H represents complex conjugate transpose.

7. The angle estimating apparatus according to claim 1, wherein
the respective signals incident to the plurality of receiving elements comprise signals reflected onto the plurality of receiving elements from a respective vehicle.

8. The angle estimating apparatus according to claim 1, wherein the receiving circuit further includes a plurality of receiving units and the plurality of receiving units are at least one of a sensor array or an antenna.

9. The angle estimating apparatus according to claim 1, wherein the transmitting device is an antenna.

10. An angle estimating apparatus for estimating an angle between vehicles, comprising:
a receiving circuit, including a signal processor and a plurality of receiving elements, that receives respective signals transmitted from a transmitting device and reflected by a vehicle, configured to use a weight to weight the respective signals relative to characteristics of the plurality of receiving elements, wherein the weight is set by a calibration process and the respective signals are at least one of ultrasonic signals, electromagnetic signals ultrasonic signals, electromagnetic signals, or frequency modulated continuous wave signals;
an estimating circuit configured to estimate an incident angle of the respective signals relative to the vehicle using the weight of the respective signals; and
a detecting circuit configured to calculate for each combination of signals from two mutually different receiving elements, spatial phase of the combination based on an estimation result calculated by the estimating circuit using two signals obtained from the combination and an interval of the receiving elements making up the combination, the detecting circuit further configured to correct an error of the weight for characteristics of the receiving circuit when it has been determined by the detecting circuit that the error occurred based on a difference between the spatial phase calculated for each combination.

11. The angle estimating apparatus according to claim 10, wherein the receiving circuit further includes a plurality of receiving units and the plurality of receiving units are at least one of a sensor array or an antenna.

12. The angle estimating apparatus according to claim 10, wherein the transmitting device is an antenna.

13. An angle estimating apparatus for estimating an angle between vehicles, comprising:
a receiving circuit, including a signal processor and a plurality of receiving elements, that receives respective signals transmitted from a transmitting device and reflected by a vehicle, configured to use a weight to weigh respective signals reflected by the vehicle relative to characteristics of the plurality of receiving elements, wherein the weight is set by a calibration process and the respective signals are at least one of ultrasonic signals, electromagnetic signals, or frequency modulated continuous wave signals;
an estimating circuit configured to estimate an incident angle of the respective signals relative to the vehicle using the weight of the respective signals;
a storing circuit configured to store a measured value of a mode vector reflecting characteristics of the receiving circuit of the weight for the characteristics of the receiving circuit; and
a detecting circuit configured to calculate a matrix W (equation (33)) based on the measured value of the mode vector stored by the storing circuit and a function capable of calculating an evaluation value that varies according to the incident angle of the respective signals and error, the detecting circuit further configured to detect occurrence of the error based on the calculated matrix W, a noise-specific vector $E_n$ obtained by a multiple signal classification technique for a plurality of incident angles $\theta_m$ (m=1 to M), and a given function (equation (34)), when the incident angle of the respective signals estimated by the estimating circuit is a given incident angle, $$W = \begin{bmatrix} LV^{-H} \\ V^{-H}\Omega^H \end{bmatrix} \quad (33)$$

$(L = [0_{1\times 2}, 1])$ $$f(C, \theta) = E_n W^H \quad (34)$$

where, in equations (33) and (34), V represents a matrix obtained from eigenvectors that decompose into eigenvalues, a given matrix ($U_1^{-1}U_2$) used for angle estimation at the estimating circuit, $\Omega$ represents the eigenvalues of the given matrix, H represents complex conjugate transpose, C represents the error, and $\theta$ represents the incident angle estimated by the estimating circuit, wherein the detecting circuit corrects the error when it has been determined that the error occurred.

14. The angle estimating apparatus according to claim 13, wherein the receiving circuit further includes a plurality of receiving units and the plurality of receiving units are at least one of a sensor array or an antenna.

15. The angle estimating apparatus according to claim 13, wherein the transmitting device is an antenna.

* * * * *